US010151250B2

(12) United States Patent
Doebbeling et al.

(10) Patent No.: US 10,151,250 B2
(45) Date of Patent: Dec. 11, 2018

(54) METHOD OF OPERATING A GAS TURBINE ASSEMBLY AND THE GAS TURBINE ASSEMBLY

(71) Applicant: ANSALDO ENERGIE SWITZERLAND AG, Baden (CH)

(72) Inventors: Klaus Doebbeling, Windisch (CH); Anton Nemet, Lengnau (CH); Martin Zajadatz, Kuessaberg (DE); Rene Waelchli, Niedergoesgen (CH)

(73) Assignee: ANSALDO ENERGIA SWITZERLAND AG, Baden (CH)

(*) Notice: Subject to any disclaimer, the term of this patent is extended or adjusted under 35 U.S.C. 154(b) by 761 days.

(21) Appl. No.: 14/600,599

(22) Filed: Jan. 20, 2015

(65) Prior Publication Data
US 2015/0204247 A1 Jul. 23, 2015

(30) Foreign Application Priority Data
Jan. 21, 2014 (EP) .................... 14151984

(51) Int. Cl.
F02C 6/18 (2006.01)
F02C 7/18 (2006.01)
(Continued)

(52) U.S. Cl.
CPC ............. *F02C 9/18* (2013.01); *F01D 9/065* (2013.01); *F01D 25/30* (2013.01); *F01D 25/305* (2013.01);
(Continued)

(58) Field of Classification Search
CPC ........ F01D 25/30; F01D 25/305; F01D 9/065; F01K 23/10; F02C 3/13; F02C 6/18;
(Continued)

(56) References Cited

U.S. PATENT DOCUMENTS 4,380,893 A * 4/1983 Stokes ...................... F02C 9/18
415/27
4,907,406 A 3/1990 Kirikami et al.
(Continued)

FOREIGN PATENT DOCUMENTS

CA 2809394 * 3/2012
EP 1 186 761 A2 3/2002
(Continued)

OTHER PUBLICATIONS

Office Action dated Apr. 28, 2018 in corresponding Chinese Patent Application No. 201500291919, and an English translation thereof.
(Continued)

*Primary Examiner* — William H Rodriguez
(74) *Attorney, Agent, or Firm* — Buchanan Ingersoll & Rooney PC

(57) ABSTRACT

The invention relates to a method of operating a gas turbine assembly, which includes a compressor, a combustor and a gas turbine. The method includes operating the gas turbine assembly at a partial load with respect to a base load of the gas turbine assembly; bypassing a portion of blow-off air from the compressor; and introducing the portion of blow-off air into an exhaust gas duct after the gas turbine. The gas turbine assembly, when operating at partial load, can maintain the air-to-fuel ratio approximately constant and hence to control the combustion flame temperature at a level where emissions are kept below the permission limit.

20 Claims, 3 Drawing Sheets

(51) Int. Cl.
*F02C 6/08* (2006.01)
*F02C 9/18* (2006.01)
*F01D 9/06* (2006.01)
*F01D 25/30* (2006.01)
*F01K 23/10* (2006.01)
*F02C 3/13* (2006.01)

(52) U.S. Cl.
CPC ............... *F01K 23/10* (2013.01); *F02C 3/13* (2013.01); *F02C 6/18* (2013.01); *F02C 6/08* (2013.01); *F05D 2220/32* (2013.01); *F05D 2220/72* (2013.01); *F05D 2270/08* (2013.01); *Y02E 20/16* (2013.01)

(58) Field of Classification Search
CPC ...... F02C 6/08; F02C 9/18; F02C 7/12; F02C 7/18; Y02E 20/16
See application file for complete search history.

(56) References Cited

U.S. PATENT DOCUMENTS

| | | | | |
|---|---|---|---|---|
| 5,174,105 | A * | 12/1992 | Hines | F02C 3/10 60/774 |
| 6,487,863 | B1 * | 12/2002 | Chen | F02C 6/08 60/39.12 |
| 6,615,574 | B1 * | 9/2003 | Marks | F02C 7/18 60/772 |
| 9,562,475 | B2 * | 2/2017 | Laurello | F02C 7/18 |
| 2001/0022075 | A1 * | 9/2001 | Mandai | F01K 23/10 60/786 |
| 2009/0053036 | A1 * | 2/2009 | Crawley | F02C 7/042 415/58.4 |
| 2010/0000219 | A1 * | 1/2010 | Snook | F02C 6/08 60/770 |
| 2010/0011779 | A1 * | 1/2010 | Senior | F01D 17/105 60/785 |
| 2010/0175387 | A1 * | 7/2010 | Foust | F01D 9/023 60/782 |
| 2010/0215480 | A1 * | 8/2010 | Leach | F02C 9/18 415/145 |
| 2010/0247292 | A1 * | 9/2010 | Davis, Jr. | F01D 5/081 415/144 |
| 2011/0135456 | A1 * | 6/2011 | Takahashi | F01D 11/24 415/180 |
| 2011/0138819 | A1 * | 6/2011 | Tanimura | F01D 25/30 60/796 |
| 2012/0186261 | A1 | 7/2012 | Toprani et al. | |
| 2012/0204574 | A1 | 8/2012 | Zhang et al. | |
| 2013/0142631 | A1 | 6/2013 | Pauli et al. | |
| 2013/0283808 | A1 * | 10/2013 | Kolvick | F02C 7/18 60/772 |
| 2013/0340439 | A1 * | 12/2013 | Ekanayake | F02C 7/047 60/779 |
| 2014/0090354 | A1 * | 4/2014 | Scipio | F01D 25/30 60/39.5 |
| 2014/0157791 | A1 * | 6/2014 | Saha | F01D 17/141 60/785 |
| 2014/0230444 | A1 * | 8/2014 | Hao | F01D 25/305 60/772 |
| 2014/0373504 | A1 * | 12/2014 | Broker | F01D 25/30 60/39.5 |
| 2015/0089955 | A1 * | 4/2015 | Knapp | F02C 6/08 60/782 |
| 2015/0132101 | A1 * | 5/2015 | Marsh | F01D 25/12 415/1 |
| 2016/0376908 | A1 * | 12/2016 | Reed | F01D 25/305 290/52 |

FOREIGN PATENT DOCUMENTS

| | | |
|---|---|---|
| EP | 1 921 278 A1 | 5/2008 |
| EP | 2 224 114 A2 | 9/2010 |
| EP | 2 336 524 A2 | 6/2011 |
| EP | 2 559 862 A1 | 2/2013 |
| EP | 2 594 741 A2 | 5/2013 |
| EP | 2634381 A1 | 9/2013 |
| WO | 2011/097121 A2 | 8/2011 |
| WO | 2012/143462 A2 | 10/2012 |

OTHER PUBLICATIONS

Office Action (Communication) dated Jul. 7, 2018, by the European Patent Office in corresponding European Patent Application No. 15150953.6. (5 pages).

Office Action (Communication) dated Jul. 10, 2018, by the European Patent Office in corresponding European Patent Application No. 15150953.6. (5 pages).

* cited by examiner

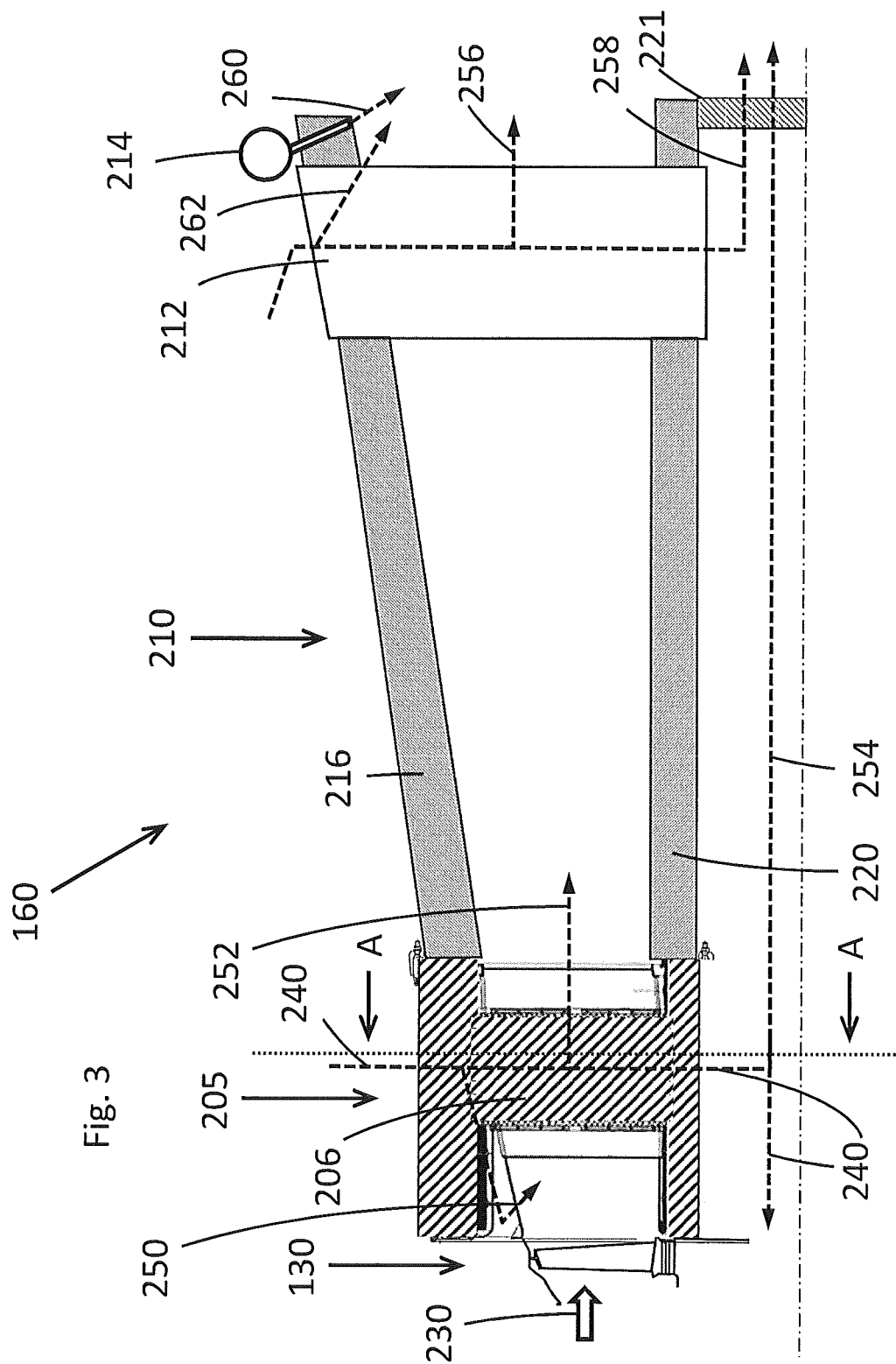

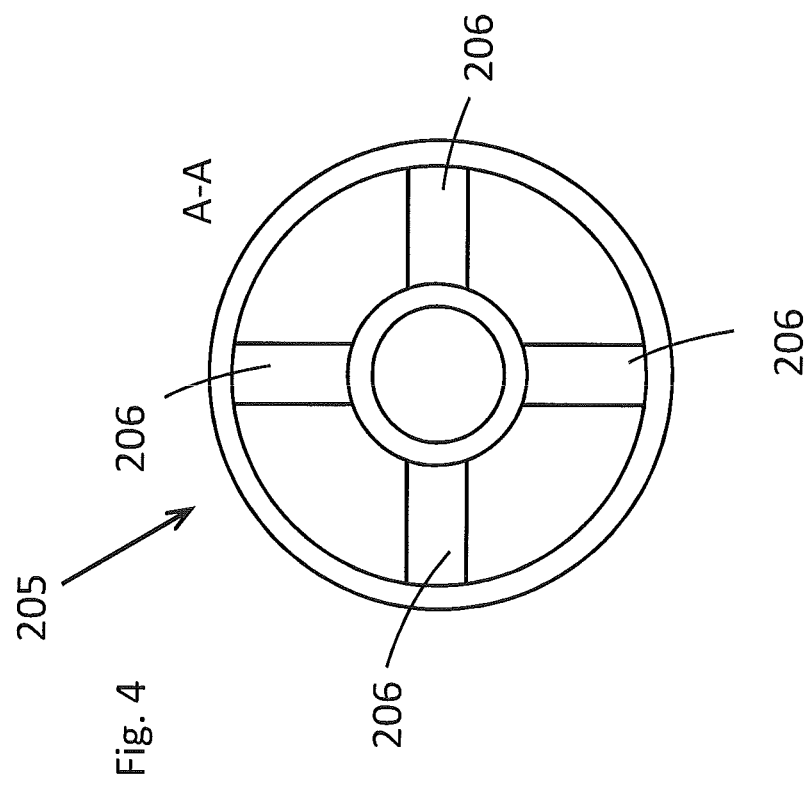

METHOD OF OPERATING A GAS TURBINE ASSEMBLY AND THE GAS TURBINE ASSEMBLY

CROSS-REFERENCE TO RELATED APPLICATIONS

This application claims priority to European application 14151984.3 filed Jan. 21, 2014, the contents of which are hereby incorporated in its entirety.

TECHNICAL FIELD

The present invention relates to the technical field of gas turbines and associated combined cycle power plants. A specific aspect of the present invention is the extension of the turndown ratio of a gas turbine with comparably simple means, applicable to both new development and retrofit applications.

BACKGROUND

State-of-the-art gas turbines are typically equipped with variable guide vanes (VGVs) to control the compressor mass flow and hence to keep the air-to-fuel ratio of the combustion process over a wide range of operation at an approximately constant level. With this measure, it is possible to control the emissions of the gas turbine effectively until the VGVs reach the closed position. Below this particular operating point, typically occurring around 30-50% relative load, the emissions of carbon monoxide (CO) and nitrogen oxides (NOx) start to rise quickly and exceed permission levels. Therefore steady-state operation may be limited in this operating range or might require the installation of a CO or NOx catalyst.

A cooling system for a turbine engine operably coupled to a generator is proposed in EP2531709, where the system comprising: an air bleed line in communication with a combustor section of the turbine engine, and in communication with a turbine section of the turbine engine; a flow control device for controlling flow through the air bleed line; and a controller for actuating the flow control device to allow bleed air to flow through the air bleed line and provide cooling air to the turbine section when an operating load is less than a base load of the turbine engine, wherein substantially all cooling air for the turbine section is obtained from compressor exit air exiting a compressor section of the turbine engine.

An exhaust gas cooler for cooling combustion exhaust gas of an internal combustion engine having a cooling medium is proposed in WO2012143462A2, wherein the exhaust gas cooler has an exhaust gas inlet for introducing hot combustion exhaust gas into the exhaust gas cooler. Furthermore, the exhaust gas cooler has an exhaust gas outlet for directing cooled combustion exhaust gas out of the exhaust gas cooler, wherein the exhaust gas outlet is fluidically connected to the exhaust gas inlet. Furthermore, the exhaust gas cooler has at least one coolant inlet for fluidically connecting the exhaust gas cooler to at least one coolant outlet of the internal combustion engine. Furthermore, the exhaust gas cooler has an interface for fluidically connecting a water collecting adapter, wherein the interface is designed to carry the coolant out of the exhaust gas cooler.

A control system for a power generating system having a gas turbine, a flue gas exhaust stage and a blow-off valve assembly is proposed in EP2559862A1, where the blow-off valve assembly selectively provides fluid communication between the compressor and the flue gas exhaust stage, the present disclosure teaches a control system comprising a controller configured and adapted to signal the blow-off assembly to provide the fluid communication in response to a sudden de-loading of the gas turbine.

SUMMARY

It is an object of the present invention is to provide a method of operating a gas turbine assembly that, when the gas turbine assembly is operating at partial load, can maintain the air-to-fuel ratio approximately constant and hence to control the combustion flame temperature at a level where emissions are kept below the permission limit without architectural adaptation of the cooling system of the gas turbine assembly.

This object is obtained by a method of operating a gas turbine assembly, which comprises a compressor, a combustor and a gas turbine, the method comprising steps of: operating the gas turbine assembly at a partial load with respect to a base load of the gas turbine assembly; bypassing a portion of blow-off air from the compressor; and introducing the portion of blow-off air into an exhaust gas duct after the gas turbine.

According to one example embodiment of the present invention, the gas turbine assembly further comprises a heat recovery steam generator connected downstream the gas turbine, the step of introducing further comprises: introducing the portion of blow-off air into the exhaust gas duct after the heat recovery steam generator.

According to one example embodiment of the present invention, the gas turbine further comprises an exhaust diffuser, and an end disk rotor bore is disposed in the gas turbine, the step of introducing further comprises: introducing the portion of blow-off air into struts of the exhaust diffuser via the end disk rotor bore so as to be directed into the exhaust gas duct.

According to one example embodiment of the present invention, the gas turbine comprise a exhaust gas housing casing, the step of introducing further comprises: introducing the portion of blow-off air into the struts of the exhaust diffuser via circumferential feed through the exhaust gas housing casing so as to be directed into the exhaust gas duct.

According to one example embodiment of the present invention, the method further comprises: adjust a flow mass of the portion of the blow-off air by means of a control valve.

This object is obtained by a gas turbine assembly, comprising: a compressor for compression of inlet air; a combustor for combustion of a fuel gas with the compressed inlet air to form an exhaust gas; a gas turbine for expansion of the exhaust gas to drive a load, wherein the gas turbine comprises an exhaust gas duct; a bypassing line leading from a blow-off point of the compressor into the exhaust gas duct after the gas turbine.

According to one example embodiment of the present invention, the gas turbine assembly further comprises a heat recovery steam generator connected downstream of the gas turbine, and the bypassing line leads from the blow-off point of the compressor into the exhaust gas duct after the heat recovery steam generator.

According to one example embodiment of the present invention, the gas turbine further comprises an exhaust diffuser, and an end disk rotor bore is disposed in the gas turbine, the bypassing line leads from the blow-off point of the compressor into struts of the exhaust diffuser via the end disk rotor bore so as to be directed into the exhaust gas duct.

According to one example embodiment of the present invention, the gas turbine comprise a exhaust gas housing casing, the bypassing line leads from the blow-off point of the compressor into the struts of the exhaust diffuser via circumferential feed through the exhaust gas housing casing so as to be directed into the exhaust gas duct.

According to one example embodiment of the present invention, a control valve is disposed in the bypass line to adjust a flow mass of the blow-off air.

When the gas turbine assembly is operating at partial load, can maintain the air-to-fuel ratio approximately constant and hence to control the combustion flame temperature at a level where emissions are kept below the permission limit.

BRIEF DESCRIPTION OF THE DRAWINGS

The objects, advantages and other features of the present invention will become more apparent upon reading of the following non-restrictive description of preferred embodiments thereof, given for the purpose of exemplification only, with reference to the accompanying drawings, through which similar reference numerals may be used to refer to similar elements, and in which:

FIG. 3 shows a cross-section view of an example of the exhaust gas duct shown in FIG. 1 and FIG. 2.

FIG. 4 shows a cross-section view along A-A in FIG. 3.

DETAILED DESCRIPTION

Figure 1:
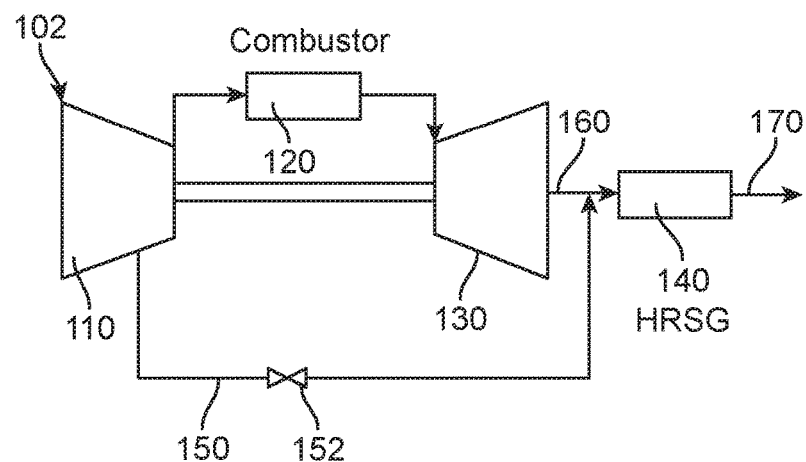
FIG. 1 shows a schematic view of a gas turbine assembly according to one example embodiment of the present invention.

FIG. 1 shows a schematic example of a gas turbine assembly 10 according to one example embodiment of the present invention. The gas turbine assembly 10 comprises a compressor 110 for compression of inlet air 102, a fluidly connected combustor 120 for combustion of a fuel gas (not shown) with the compressed inlet air 102 to form an exhaust gas, and a fluidly connected gas turbine 130 for expansion of the exhaust gas to drive a load (not shown). An exhaust gas duct 160 is formed downstream of the gas turbine 130 to transfer the exhaust gas. In certain applications, the gas turbine assembly 10 may further comprises a heat recovery steam generator (HRSG) 140 fluidly connected downstream of the gas turbine 130 for collecting at least a portion of the exhaust gas discharged from the turbine 130. In this case, the exhaust gas duct 160 is extended through the HRSG 140. The portion of the exhaust gas duct downstream of the HRSG 140 may be referred to be exhaust gas duct 170. It should be noticed that the gas turbine assembly 10 shown in FIG. 1 is merely an example, for which the gas turbine assembly 10 may be embodied into sequential combustion configuration with high-pressure turbine and low-pressure turbine and other necessary components. As a conventional configuration, the gas turbine assembly 10 comprises a blow-off system, not shown, for reducing the pressure of the compressed air in the compression stage.

As described above, when the gas turbine assembly 10 is operated at a partial load with respect to a base load of the gas turbine assembly 10, such as 30%-50% relative load, the emission of carbon monoxide (CO) and nitrogen oxide (NOx) start to rise quickly and exceed permission level. In addressing such problem, the blow-off system of the gas turbine is utilized. As shown in FIG. 1, the gas turbine assembly 10 comprises a bypassing line 150 leading from a blow-off point of the compressor 110 into the exhaust gas duct 160 after the gas turbine 130 for bypassing a portion of blow-off air from the compressor 110, and introducing the portion of blow-off air into an exhaust gas duct 160 after the gas turbine 130. This measure allows maintaining the air-to-fuel ratio approximately constant and hence to control the combustion flame temperature at a level where emissions are kept below the permission limits. Different from other solutions that require architectural adaptation of the cooling air system, the present invention adopts the already existing cooling air distribution hardware and is therefore applicable to both new development and retrofit applications.

As an example embodiment, a control valve 152 is disposed in the bypass line 150 to adjust a flow mass of the blow-off air.

Figure 2:
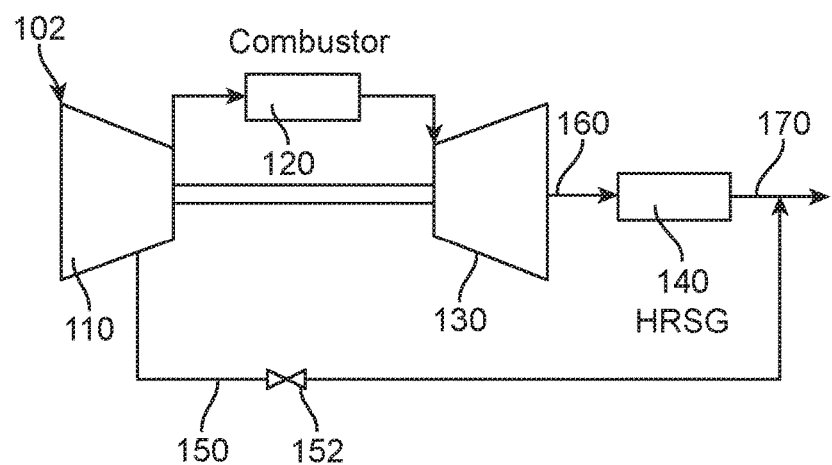
FIG. 2 shows a schematic view of another gas turbine assembly according to one example embodiment of the present invention.

As an alternative configuration, the bypassing line 150 may lead from the blow-off point of the compressor 110 into the exhaust gas duct 170 after the heat recovery steam generator 140 as shown in FIG. 2. This structure may facilitate retrofit arrangement for combined cycle power plant with HRSG 140. In this case, the bypassing line 150 may be used to introduce the portion of blow-off air into the exhaust gas duct 170 after the HRSG 140. Similarly, a control valve 152 is disposed in the bypass line 150 to adjust a flow mass of the blow-off air.

Many different conventional structures may be used to achieve the bypassing function of the bypassing line 150. As one example embodiment, not shown, the gas turbine 130 comprises an exhaust diffuser, and an end disk rotor bore (not shown) is disposed in the gas turbine 130, the bypassing line 150 may be used to introduce the portion of blow-off air into the end disk rotor bore feed in struts of the exhaust diffuser so as to be directed into the exhaust gas duct 160. Examples of the exhaust diffuser may be referred to the prior patent documents with the same assignee as the present invention, such as EP2594741 A2 and EP1921278 A1.

As another example embodiment, not shown, the gas turbine 130 may comprise a exhaust gas housing casing (outer diffuser casing; described below). The bypassing line 150 may be used to introduce the portion of blow-off air into the struts of the exhaust diffuser via a circumferential feed (described below) through the exhaust gas housing casing so as to be directed into the exhaust gas duct 160. Examples of the exhaust gas housing casing may be referred to the prior patent documents with the same assignee as the present invention, such as US20130142631 A1.

FIG. 3 shows the exhaust gas duct 160 of FIG. 1, comprising a bearing strut housing 205 and a diffuser 210 (exhaust diffuser/exhaust gas diffuser). The last part of gas turbine 130 is also shown.

The bearing strut housing 205 comprises struts 206 that can hold the turbine side bearing in place. These struts typically have internal cooling for gas turbines with high turbine outlet temperatures (greater than 540° C.). Similarly, the exhaust gas housing has a diffuser casing comprising inner and outer liners (outer diffuser casing 216 and inner diffuser casing 220) that can include internal cooling pathways, as can strut 212 (described below). Using existing internal cooling pathways in this manner can improve the cooling of the parts the pathways go through, which can be useful at part load in particular when the exhaust gas temperature may increase. Similarly, blow-off air can help reduce the exhaust gas temperature itself. Multiple exit points for the blow-off air is preferred as it can improve mixing of the blow-off air with the exhaust gas 230.

The diffuser 210 comprises struts such as bearing strut 206 and strut 212, along with optional circumferential loop distributor 214 (circumferential feed), outer diffuser casing 216, and inner diffuser casing 220. Inner diffuser casing 220 delineates the inner limit of the diffuser and can also encase the bearing (not shown).

Circumferential loop distributor 214 leads via pipes to a plurality of exit holes arranged around the circumference of the diffuser 210. This allows the blow-off air to be mixed more evenly into the exhaust gas 230 compared to a single direct feed.

FIG. 4 shows a cross-section view along the line A-A in FIG. 3. A number of struts 206 are placed around the circumference of the bearing strut housing 205, in this case four although other numbers of struts are also possible. Struts 212 can be arranged in a similar manner, although typically only one is provided. Strut 212 may incorporate an access point (manhole) for access to the turbine bearing.

Blow-off air that is bypassed along the bypassing line 150 is mixed into the main turbine exhaust gas flow in the exhaust gas duct 160. A number of feed locations to feed (direct) the blow-off air into the exhaust gas flow 230 are possible, as listed below. One of the feed locations may be used alone, or a combination of two or more of them may be used.

There are three types of feed location at the upper end of the diffuser (with respect to the exhaust gas flow). These can use part of the existing end disk rotor bore feed 240:
Feeding 250 through the bearing strut housing 205 into the main turbine exhaust gas flow 230 immediately after the gas turbine 130.
1. Feeding 252 through the bearing strut 206.
2. Feeding 254 through the bearing strut 206 and the inner diffuser casing 220, preferably through the blunt end 221.

Three other types of feed location are available at the lower end of the diffuser (with respect to the exhaust gas flow):
3. Feeding 256 through strut 212.
4. Feeding 258 through strut 212 and the inner diffuser casing 220, preferably through the blunt end 221.
5. Feeding 260 through the circumferential loop distributor 214.
6. Feeding into the main turbine exhaust gas flow 230 from the outer diffuser casing (path in the outer diffuser casing not shown).

All of these feeds may include feeding through other existing cooling pipes. For example, cooling pipes may be included within the outer diffuser casing and these may be used for feeds 256, 258, 260 and 262 in particular.

Feeding 254 and 258 out through the inner diffuser casing 220 can exit out of the blunt end 221 of the inner diffuser casing 220. Blow-out air entering the exhaust stream here can improve the diffuser performance.

The exhaust gas duct 160 described above may also be used as exhaust gas duct 170 after the heat recovery steam generator as shown in the embodiment of FIG. 2.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of operating a gas turbine assembly, which includes a compressor, a combustor, a gas turbine, and a heat recovery steam generator connected downstream the gas turbine, the method comprising:
    operating the gas turbine assembly at a partial load with respect to a base load of the gas turbine assembly;
    introducing at least a portion of an exhaust gas discharged from the gas turbine into an exhaust gas duct extending through the heat recovery steam generator;
    bypassing a portion of blow-off air from the compressor; and
    introducing the portion of blow-off air into the exhaust gas duct after the heat recovery steam generator with the at least the portion of the exhaust gas discharged from the gas turbine, in which the portion of blow-off air is fed via a bearing strut housing, a bearing strut, a diffuser casing, a circumferential loop distributor or a diffuser strut.

2. The method according to claim 1, further comprising: adjusting a flow mass of the portion of the blow-off air with a control valve.

3. The method according to claim 1, wherein the operating of the gas turbine assembly at the partial load with respect to the base load of the gas turbine assembly comprises:
    operating the gas turbine assembly at 30% to 50% relative load.

4. The method according to claim 1, further comprising: emitting carbon monoxide and nitrogen oxide from the gas turbine assembly during the operating of the gas turbine assembly at the partial load.

5. The method according to claim 1, further comprising:
    maintaining a constant air-to-fuel ratio in the combustor; and
    controlling a combustion flame temperature of the combustor at a level where emissions are kept below a permissible limit by bypassing the portion of the blow-off air from the compressor into the exhaust gas duct.

6. The method according to claim 1, further comprising:
    introducing the portion of blow-off air into the exhaust gas duct after the heat recovery steam generator from multiple exit holes in a bypass line.

7. The method according to claim 1, further comprising:
    reducing a temperature of the exhaust gas from the gas turbine with the portion of the blow-off air.

8. A gas turbine assembly, comprising:
    a compressor for compression of inlet air;
    a combustor for combustion of a fuel gas with the compressed inlet air to form an exhaust gas;
    a gas turbine for expansion of the exhaust gas to drive a load, wherein the gas turbine includes an exhaust gas duct;
    a heat recovery steam generator connected downstream of the gas turbine, the exhaust duct extending through the heat recovery steam generator; and
    a bypass line leading from a blow-off point of the compressor into the exhaust gas duct after the heat recovery steam generator, in which a portion of blow-off air is fed via a bearing strut housing, a bearing strut, a diffuser casing, a circumferential loop distributor and/or a diffuser strut into the exhaust gas duct, and the portion of blow-off air is combined with the exhaust gas from the gas turbine in the exhaust gas duct.

9. The gas turbine assembly according to claim 8, further comprising:

a control valve is disposed in the bypass line to adjust a flow mass of the blow-off air.

10. The gas turbine assembly according to claim 8, wherein the gas turbine assembly is operated at a partial load with respect to a base load of the gas turbine assembly, and wherein the partial load of the gas turbine assembly is 30% to 50% relative load.

11. The gas turbine assembly according to claim 10, wherein the gas turbine assembly emits carbon monoxide and nitrogen oxide during the operating of the gas turbine assembly at the partial load.

12. The gas turbine assembly according to claim 8, wherein a constant air-to-fuel ratio is maintained in the combustor, and a combustion flame temperature of the combustor is controlled at a level where emissions are kept below a permissible limit by bypassing the portion of blow-off air from the compressor into the exhaust gas duct.

13. The gas turbine assembly according to claim 8, wherein the portion of blow-off air is introduced into the exhaust gas duct after the heat recovery steam generator from multiple exit holes in the bypass line, and a temperature of the exhaust gas from the gas turbine is reduced with the blow-off air.

14. A method of operating a gas turbine assembly, which includes a compressor, a combustor, a gas turbine, and a heat recovery steam generator connected downstream the gas turbine, the method comprising:
   operating the gas turbine assembly at a partial load with respect to a base load of the gas turbine assembly, the partial load being 30% to 50% relative load;
   introducing at least a portion of an exhaust gas discharged from the gas turbine into an exhaust gas duct extending through the heat recovery steam generator;
   bypassing a portion of blow-off air from the compressor; and
   introducing the portion of blow-off air into the exhaust gas duct after the heat recovery steam generator with the exhaust gas from the heat recovery generator.

15. The method according to claim 14, further comprising:
   adjusting a flow mass of the portion of the blow-off air with a control valve.

16. The method according to claim 14, further comprising:
   emitting carbon monoxide and nitrogen oxide from the gas turbine assembly during the operating of the gas turbine assembly at the partial load.

17. The method according to claim 14, further comprising:
   maintaining a constant air-to-fuel ratio in the combustor.

18. The method according to claim 14, further comprising:
   controlling a combustion flame temperature of the combustor at a level where emissions are kept below a permissible limit by bypassing the portion of blow-off air from the compressor into the exhaust gas duct.

19. The method according to claim 14, further comprising:
   introducing the portion of blow-off air into the exhaust gas duct after the heat recovery steam generator from multiple exit holes in a bypass line.

20. The method according to claim 14, further comprising:
   reducing a temperature of the exhaust gas from the gas turbine with the blow-off air.

* * * * *